United States Patent
Lu et al.

(10) Patent No.: US 8,766,916 B2
(45) Date of Patent: Jul. 1, 2014

(54) POINTING DEVICE WITH MULTIPLE VIEW ANGLES

(75) Inventors: Chun-Yi Lu, Hsin-Chu (TW);
Cheng-Kuang Sun, Hsin-Chu (TW);
Yao-Hui Tseng, Hsin-Chu (TW);
Horng-Goung Lai, Hsin-Chu (TW);
Chao-Chien Huang, Hsin-Chu (TW);
Meng-Huan Hsieh, Hsin-Chu (TW)

(73) Assignee: PixArt Imaging Inc., Science-Based Industrial Park, Hsin-Chu (TW)

(*) Notice: Subject to any disclaimer, the term of this patent is extended or adjusted under 35 U.S.C. 154(b) by 102 days.

(21) Appl. No.: 13/527,562

(22) Filed: Jun. 19, 2012

(65) Prior Publication Data
US 2013/0063348 A1 Mar. 14, 2013

(30) Foreign Application Priority Data
Sep. 9, 2011 (TW) ............... 100132666 A

(51) Int. Cl.
*G06F 3/033* (2013.01)
*G09G 5/08* (2006.01)

(52) U.S. Cl.
USPC .......... 345/158; 345/156; 345/157; 345/173; 345/175; 345/179

(58) Field of Classification Search
CPC ... G06F 1/3259; G06F 3/0304; G06F 3/0325; G06F 3/0338; G06F 3/0421; Y02B 60/1253
USPC .................. 345/156–173, 175, 179
See application file for complete search history.

(56) References Cited

U.S. PATENT DOCUMENTS 7,239,304 B2 * 7/2007 Hoshino et al. ............... 345/175
2012/0001848 A1 * 1/2012 Lu et al. ....................... 345/157

* cited by examiner

*Primary Examiner* — Kevin M Nguyen
*Assistant Examiner* — Kenneth B Lee, Jr.
(74) *Attorney, Agent, or Firm* — Winston Hsu; Scott Margo

(57) ABSTRACT

A pointing device includes two lenses with wide and narrow view angles respectively. In a short distance range, the pointing device utilizes the lens with wide view angle to increase visible range. In a long distance range, the pointing device utilizes the lens with narrow view angle to increase size of a formed image of a reference point. In addition, the pointing device senses images through both of the lenses with wide and narrow view angles to obtain rotational information. The pointing device can provide not only positional information but also angular information.

9 Claims, 4 Drawing Sheets

POINTING DEVICE WITH MULTIPLE VIEW ANGLES

BACKGROUND OF THE INVENTION

1. Field of the Invention

The present invention relates to a pointing device, and more particularly, to a pointing device with multiple view angles.

2. Description of the Prior Art

An interactive multimedia system generally comprises a monitor, an interactive module, and a pointing device. Take a video game console, Wii, for example. The Wii console is the interactive module, and the Wii remote is the pointing device. The interactive module controls contents displayed on the monitor according to positional information provided by the pointing device. The pointing device senses a reference point to obtain the positional information, and provides the information to the interactive module. More specifically, the reference point is a light source near by the monitor, and the pointing device comprises a lens, an image sensing device, and a processor. The light source is sensed by the image sensing device through the lens for generating an image. The processor then obtains the positional information according to a position of the reference point in the image.

A sensing range of the pointing device is determined by selection of lenses. For example, when utilizing a lens with wide view angle, the pointing device has a wider sensing range, and the reference point has less possibility to be out of the sensing range. However, an image of the reference point formed in the pointing device is smaller, such that the pointing device can not be placed far away from the reference point. On the contrary, the pointing device utilizing a lens with narrow view angle can be placed at a longer distance from the reference point. However, the reference point has higher possibility to be out of the sensing range. Therefore, in the prior art, manufacturers of the pointing devices are not able to give consideration to both the sensing distance and the view angle of the pointing device.

SUMMARY OF THE INVENTION

The present invention provides a pointing device with multiple view angles. The pointing device comprises a first lens with a first view angle, a second lens with a second view angle, a sensing device for sensing a reference point through the first lens in order to generate a first sensing image and for sensing the reference point through the second lens in order to generate a second sensing image, and a processing device comprising a position calculation circuit for generating positional information according to the first sensing image and/or the second sensing image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
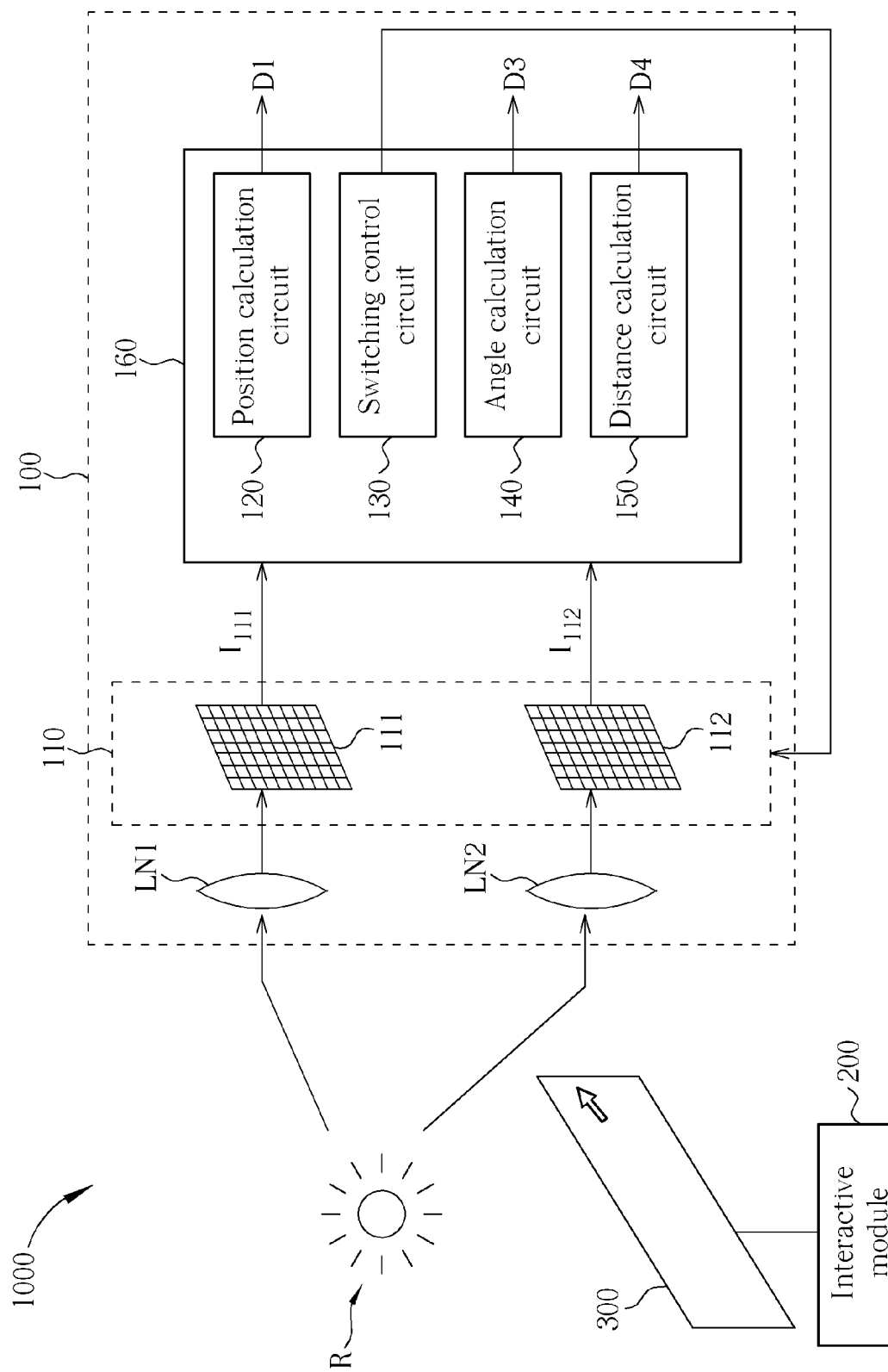
FIG. 1 is a diagram showing a pointing device with multiple view angles of the present invention.

FIG. 1 is a diagram showing a pointing device 100 with multiple view angles of the present invention. The pointing device 100 can be applied to an interactive multimedia system 1000. The interactive multimedia system 1000 comprises the pointing device 100, an interactive module 200, a monitor 300, and a reference point R. The reference point R is arranged to be near the monitor 300. The reference point R can be a non-visible light source (such as a light-emitting diode) or a predetermined pattern. The pointing device 100 comprises lenses LN1 and LN2, a sensing device 110, and a processing device 160. The processing device 160 comprises a position calculation circuit 120, a switching control circuit 130, an angle calculation circuit 140, and a distance calculation circuit 150. The sensing device 110 comprises sensing matrixes 111 and 112. In other embodiments of the present invention, the sensing matrixes 111 and 112 can be integrated into a single sensing matrix, and the sensing matrixes 111 and 112 are arranged next to each other on the single sensing matrix.

The sensing matrix 111 senses the reference point R through the lens LN1 for generating a sensing image I111; the sensing matrix 112 senses the reference point R through the lens LN2 for generating a sensing image I112. A view angle of the lens LN1 is greater than a view angle of the lens LN2, thus the lens LN1 is utilized for sensing in a short distance range and the lens LN2 is utilized for sensing in a long distance range. The pointing device 100 senses the reference point R for generating positional information D1, and provides the positional information to the interactive module 200. The interactive module 200 controls contents displayed on the monitor 300 according to the positional information. For example, the interactive module 200 moves a cursor displayed on the monitor 300 according to the positional information D1 provided by the pointing device 100.

The pointing device 100 of the present invention can operate in a lens switching mode and in an angle detection mode. In the lens switching mode, the sensing matrixes 111 and 112 do not operate at the same time. In the angle detection mode, the sensing matrixes 111 and 112 can operate at the same time.

Figure 2:
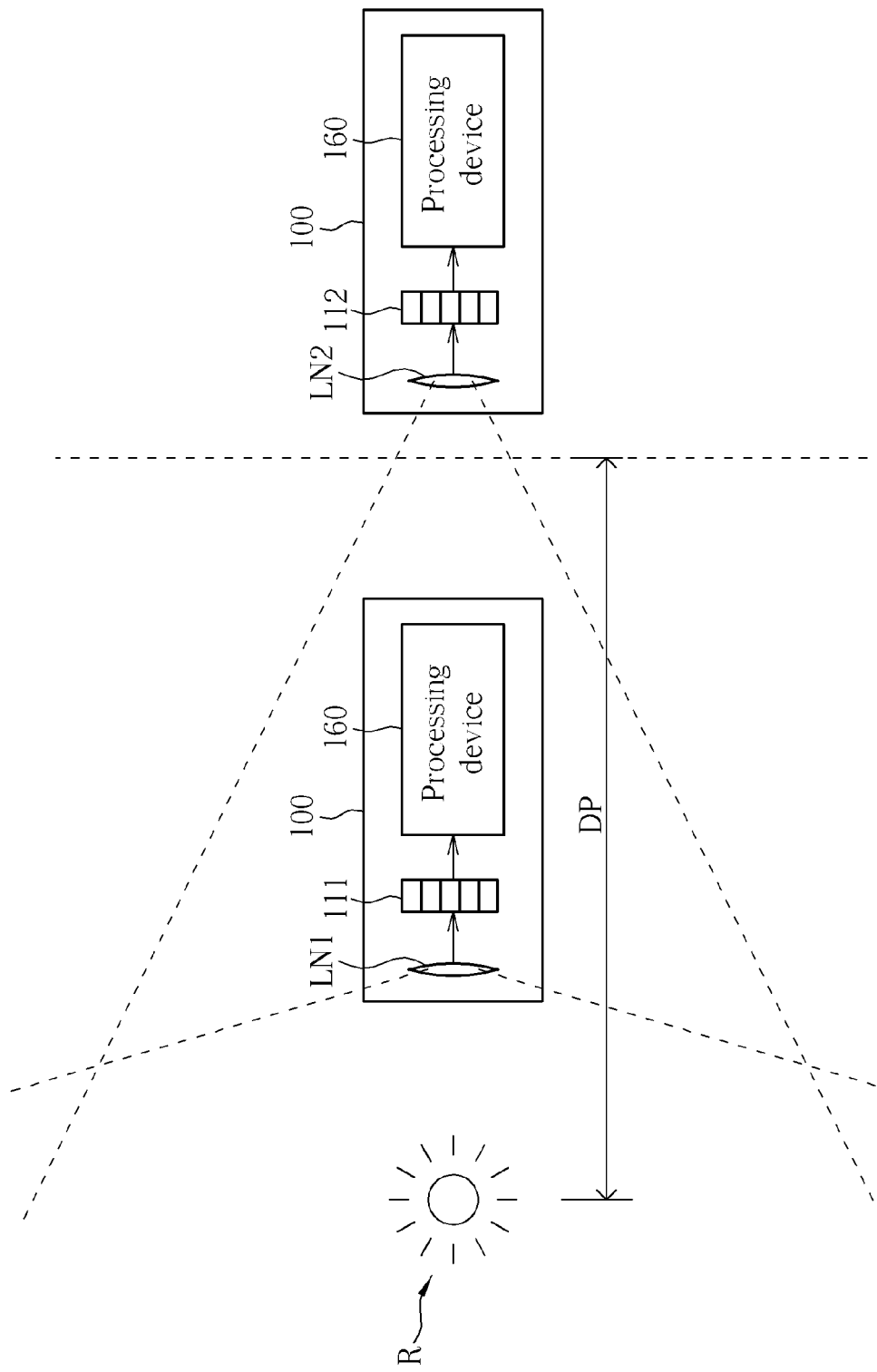
FIG. 2 is a diagram showing the pointing device of the present invention operating in the lens switching mode.

FIG. 2 is a diagram showing the pointing device 100 of the present invention operating in the lens switching mode. In the lens switching mode, a predetermined distance DP is set as a condition for switching between the sensing matrix 111 and the sensing matrix 112. The predetermined distance DP corresponds to an image size or a brightness value of an image of the reference point R formed on the sensing matrix 111 or 112. More specifically, the lens LN1 with wide view angle is utilized for sensing in a short distance range; the lens LN2 with narrow view angle is utilized for sensing in a long distance range. Therefore, when a distance between the pointing device 100 and the reference point R is less than the predetermined distance DP (in a short distance range), the switching control circuit 130 turns off the sensing matrix 112 and turns on the sensing matrix 111, such that the reference point R is sensed by the sensing matrix 111 through the lens LN1 for generating the sensing image I111. The position calculation circuit 120 then generates the positional information D1 according to the position of the reference point R formed in the sensing image I111.

On the contrary, when the distance between the pointing device 100 and the reference point R is greater than the predetermined distance DP (in a long distance range), the switching control circuit 130 turns off the sensing matrix 111 and turns on the sensing matrix 112, such that the reference point R is sensed by the sensing matrix 112 through the lens LN2 for generating the sensing image I112. The position calculation circuit 120 then generates the positional information D1 according to the position of the reference point R formed in the sensing image I112.

The distance between the pointing device 100 and the reference point R can be determined by the image size or the brightness value of the image of the reference points R formed on the sensing images I111 and I112. For example, in an initial state, the distance between the pointing device 100 and the reference point R is less than the predetermined distance DP. The switching control circuit 130 turns on the sensing matrix 111 for sensing the reference point R and generates the sensing image I111. The position calculation circuit 120 generates the positional information D1 according to the sensing image I111. The image of the reference point R formed in the sensing image I111 gets smaller when the pointing device 100 moves away from the reference point R. Therefore, when an image size of the reference point R formed in the sensing image I111 is smaller than a predetermined value, the distance between the pointing device 100 and the reference point R is determined to be greater than the predetermined distance DP. The switching control circuit 130 then turns off the sensing matrix 111 and turns on the sensing matrix 112 for sensing the reference point R through the lens LN2 with narrow view angle. The position calculation circuit 120 then generates the positional information D1 according to the sensing image I112.

On the other hand, if the distance between the pointing device 100 and the reference point R is greater than the predetermined distance DP in the initial state, the switching control circuit 130 turns on the sensing matrix 112 for sensing the reference point R and generates the sensing image I112. The position calculation circuit 120 generates the positional information D1 according to the sensing image I112. The image of the reference point R formed in the sensing image I111 gets larger when the pointing device 100 moves toward the reference point R. Therefore, when the image size of the reference point R formed in the sensing image I112 is greater than the predetermined value, the distance between the pointing device 100 and the reference point R is determined to be less than the predetermined distance DP. And the switching control circuit 130 turns off the sensing matrix 112 and turns on the sensing matrix 111 for sensing the reference point R through the lens LN1 with wide view angle. The position calculation circuit 120 then generates the positional information D1 according to the sensing image I111.

In addition, different threshold distances DP1 and DP2 can be set for the sensing matrixes 111 and 112 respectively, wherein the threshold distance DP1 is greater than the threshold distance DP2. When the pointing device 100 is sensing the reference point R by the sensing matrix 111, and the distance between the pointing device 100 and the reference point R is greater than the threshold distance DP1, the switching control circuit 130 turns off the sensing matrix 111 and turns on the sensing matrix 112. When the pointing device 100 is sensing the reference point R by the sensing matrix 112, and the distance between the pointing device 100 and the reference point R is less than the threshold distance DP2, the switching control circuit 130 turns off the sensing matrix 112 and turns on the sensing matrix 111. When the distance between the pointing device 100 and the reference point R is between the threshold distance DP1 and the threshold distance DP2, the pointing device 100 turns on both sensing matrixes 111 and 112 at the same time, and the positional information is obtained by averaging sensing results of the sensing matrixes 111 and 112.

Besides the image size of the reference point, the brightness value of the image of the reference point R can also be utilized to determine the distance. For example, when the brightness value of the image of the reference point R is greater than a predetermined value, the distance between the pointing device 100 and the reference point R is determined to be less than the predetermined distance DP; when the brightness value of the image of the reference point R is less than the predetermined value, the distance between the pointing device 100 and the reference point R is determined to be greater than the predetermined distance DP.

Figure 3:
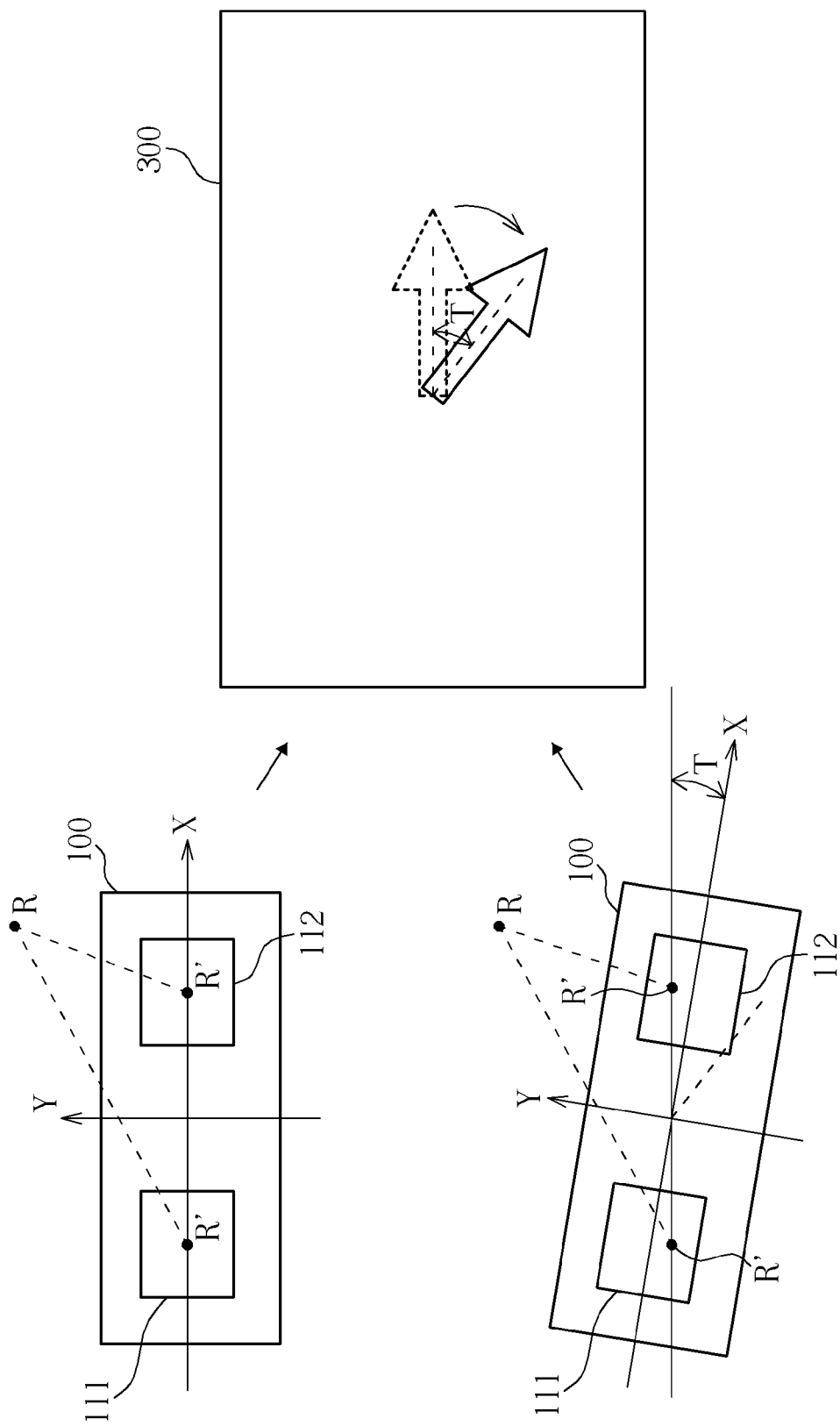
FIG. 3 is a diagram showing the pointing device of the present invention detecting a rotational angle.

FIG. 3 is a diagram showing the pointing device 100 of present invention detecting a rotational angle. In the angle detection mode, both the sensing matrixes 111 and 112 are turned on at the same time for sensing the reference point R through the lenses LN1 and LN2 to generate the sensing images I111 and I112 respectively. The angle calculation circuit 140 generates angular information D3 according to positions of the reference point R formed in the sensing images I111 and I112. The angular information D3 is provided to the interactive module 200 for obtaining information of rotational direction and rotational angle of the pointing device 100. For example, if the pointing device 100 is initially arranged in a horizon direction, when the pointing device 100 is rotated, the angle calculation circuit 140 obtains the rotational information of the pointing device 100, and then provides the rotational information to the interactive module 200.

FIG. 3 shows the pointing device 100 of present invention rotated in a certain angle. When the pointing device 100 rotates in an angle of T, the angle calculation circuit 140 obtains the rotational angle T according to positions of images R' of the reference point R sensed by the sensing matrixes 111 and 112, and the angular information D3 is provided to the interactive module 200. The interactive module 200 then rotates a cursor displayed on the monitor 300 in the angle of T clockwise or counterclockwise. Therefore, the pointing device 100 provides not only positional information but also rotational information. If only one lens is arranged in the pointing device, a gyroscope is further needed to be arranged in the pointing device for obtaining the rotational information. In contrast to such arrangement, the pointing device 100 of the present invention can obtain the rotational information according to the sensing images through the two lenses without adding the gyroscope.

Figure 4:
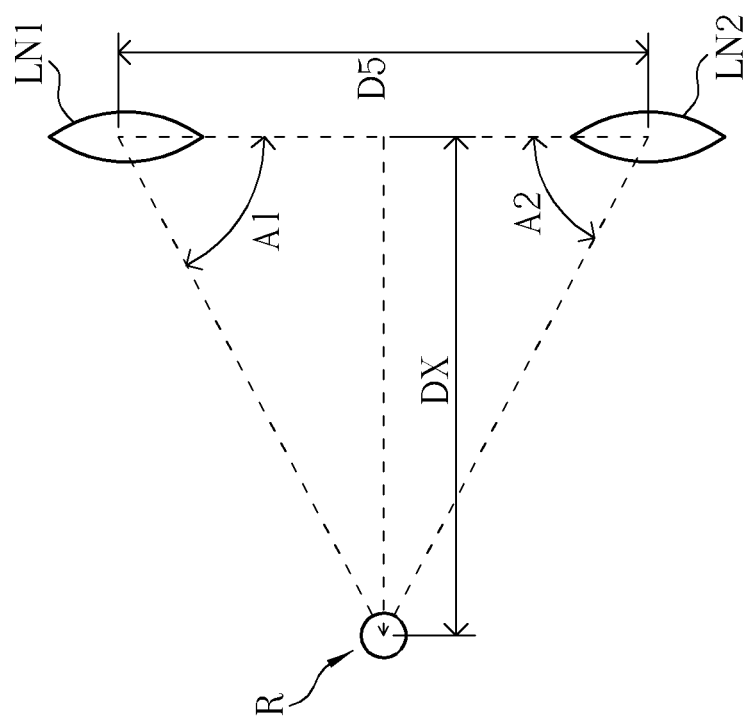
FIG. 4 is a diagram showing a distance calculation circuit of the pointing device of the present invention.

FIG. 4 is a diagram showing the distance calculation circuit of the pointing device of the present invention calculating distance. The distance calculation circuit 150 is utilized for precisely calculating a distance DX between the pointing device 100 and the reference point R. Since a distance D5 between the lens LN1 and the lens LN2 is predetermined, and angles A1 and A2 can be obtained according to the positions of the images of the reference point R formed in the sensing images I111 and I112 respectively, the distance calculation circuit 150 can determine the distance DX between the pointing device 100 and the reference point R according to the angle A1, the angle A2, and the distance D5, in order to provide distance information D4 to the interactive module 200.

In addition, the sensing device of the present invention senses images through two lenses by two different sensing matrixes. The sensing device can also utilize one single sensing matrix to sense the images through the two lenses. For example, the single sensing matrix can sense images through different lenses in a multi-task mode. That is, the single sensing matrix can sense an image through a first lens in a first time interval and sense another image through the second lens in a second time interval, such that two different sensing images can be provided to the angle calculation circuit and the distance calculation circuit for calculating the rotational information and the distance information.

Summarizing the above, the present invention provides a pointing device with multiple view angles. The pointing device can effectively increase the view angle and the sensing range by utilizing lenses with different view angles. When the distance between the pointing device and the reference point is short, a lens with wide view angle is utilized to sense images; when the distance between the pointing device and the reference point is long, a lens with narrow view angle is utilized to sense images. Therefore, the pointing device of the present invention has a wider view angle in the short distance range, and the pointing device of the present invention obtains images of the reference point with sufficient sizes in the long distance range. Therefore, the requirement for resolution of the pointing device can be reduced. In addition, the pointing device of the present invention can further obtain the rotational information and the distance information by adding an additional lens, which provides more convenience to users.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pointing device with multiple view angles, comprising:
   a first lens with a first view angle;
   a second lens with a second view angle;
   a sensing device comprising a first sensing matrix for sensing a reference point through the first lens in order to generate a first sensing image, and a second sensing matrix for sensing the reference point through the second lens in order to generate a second sensing image; and
   a processing device comprising a position calculation circuit for generating positional information according to the first sensing image and/or the second sensing image, and a switching control circuit for controlling the sensing device to sense the reference point through the first lens and/or the second lens according to the positional information;
   wherein when the first sensing image conforms to a first predetermined condition, the switching control circuit controls the sensing device to sense the reference point through the second lens; when the second sensing image conforms to a second predetermined condition, the switching control circuit controls the sensing device to sense the reference point through the first lens;
   wherein when the first sensing image conforms to the first predetermined condition, the switching control circuit turns off the first sensing matrix and turns on the second sensing matrix; when the second sensing image conforms to the second predetermined condition, the switching control circuit turns off the second sensing matrix and turns on the first sensing matrix.

2. The pointing device of claim 1, wherein when an image size of the first sensing image is smaller than a predetermined value, the first sensing image conforms to the first predetermined condition; when an image size of the second sensing image is greater than the predetermined value, the second sensing image conforms to the second predetermined condition.

3. The pointing device of claim 1, wherein when a brightness value of the reference point formed in the first sensing image is smaller than a predetermined value, the first sensing image conforms to the first predetermined condition; when a brightness value of the reference point formed in the second sensing image is greater than the predetermined value, the second sensing image conforms to the second predetermined condition.

4. The pointing device of claim 1, wherein the first sensing matrix and the second sensing matrix are integrated into a single sensing matrix.

5. The pointing device of claim 1, wherein the processing device further comprises:
   an angle calculation circuit for generating angular information according to the first sensing image and the second sensing image.

6. The pointing device of claim 1, wherein the processing device further comprises:
   a distance calculation circuit for generating distance information according to the first sensing image and the second sensing image.

7. The pointing device of claim 1, wherein the reference point is a predetermined pattern.

8. The pointing device of claim 1, wherein the reference point is a light source.

9. The pointing device of claim 1, wherein the first view angle is greater than the second view angle.

* * * * *